United States Patent [19]

Clearwater

[11] Patent Number: 4,887,087
[45] Date of Patent: Dec. 12, 1989

[54] METHOD OF DISPLAYING DETECTED INFORMATION ABOUT A ROTATING MASS

[75] Inventor: Walter A. Clearwater, Droitwich, England

[73] Assignee: Micro Control Technology Limited, Hampshire, England

[21] Appl. No.: 475,252

[22] Filed: Mar. 14, 1983

[30] Foreign Application Priority Data

Mar. 16, 1982 [GB] United Kingdom ............... 8207575
Apr. 22, 1982 [GB] United Kingdom ............... 8211646

[51] Int. Cl.$^4$ ............................................. G01S 13/00
[52] U.S. Cl. ........................................ 342/61; 342/127
[58] Field of Search .................. 343/5 HE, 10, 5 SA, 343/14; 73/455, 462, 178 H

[56] References Cited

U.S. PATENT DOCUMENTS

| | | | |
|---|---|---|---|
| 2,552,739 | 5/1951 | Roberts | 73/455 X |
| 2,913,700 | 11/1959 | Brody | 73/455 X |
| 3,386,031 | 5/1968 | Able et al. | 73/455 |
| 4,053,123 | 10/1977 | Chadwick | 73/455 X |
| 4,465,367 | 8/1984 | Sabatier | 73/455 X |

Primary Examiner—Thomas H. Tarcza
Assistant Examiner—Mark Hellner
Attorney, Agent, or Firm—Wallenstein, Wagner & Hattis, Ltd.

[57] ABSTRACT

In a method of detecting the deflection of the blades 13 of a helicopter rotor as it rotates, a beam 14 of radiation from a transmitter/receiver 11 encounters the tips of the rotating blades which send reflected signals to the receiver. The phase difference due to deflection of the blade tip can be used to give a measure of the deflection of each blade, and that can be displayed graphically as shown in FIGS. 7–10 for the various blades at various speeds. In a related method of measuring deflections of the blades 111 for a tail rotor, a laser beam transmitter 16 in FIG. 14 has its reflected beam 122, 123 from an undeflected blade 111 or a deflected blade 111' received by a particular receiver in a linear array 119 of receivers so that the particular receiver gives an indication of the amount of deflection.

7 Claims, 7 Drawing Sheets

METHOD OF DISPLAYING DETECTED INFORMATION ABOUT A ROTATING MASS

DESCRIPTION

1. Technical Field

This invention relates to methods of detecting deflections of parts of a rotating mass and was developed for particular application in detecting the degree of unbalance of a helicopter rotor although the method invented does have application to other rotating masses.

2. Background Prior Art

When the method is applied to the detection of deflections of helicopter rotor blades, it is convenient if the results calculated from the test can be displayed in a manner which is very readily understood, and another aspect of the invention is the method of displaying the calculated information.

It is important that a helicopter rotor should be balanced in terms of mass about its entire center of rotation and have equality of lift from each blade, whether it is a main lifting rotor or a tail rotor. A balanced rotor is one in which the blades are maintained equiangularly spaced around the axis of rotation, and in which the rotor tips rotate in the same horizontal plane with each other, and generate equal lift throughout the speed range. The plane will be different at different flight speeds but the important thing is that at a given speed, all the tips are rotating in the same plane, and generating equal lift. It is known how much each blade is deflected in relation to the others, at different flight speeds, and in the past such deflections have been measured visually or by trial and error, and results have not only been unreliable but they have also taken a considerable time to evaluate.

SUMMARY OF THE INVENTION

According to the present invention, in a method of detecting deflections of parts of a rotating mass, a beam of transmitted radiation is directed at the parts in turn as they rotate, and radiation received after reflection from them is used to determine their range.

The present invention according to which the range of, for example, each rotor blade tip from a transmitter/receiver is measured as the blade concerned passes a particular point in the path of rotation, has been shown to give surprisingly accurate results which are available from a computer very shortly after received signals have been fed into the computer.

One preferred type of transmitter/receiver is a double Doppler radar system with two closely spaced transmitter/receivers transmitting at frequencies slightly displaced from each other and with the phase difference of the reflected signals being a measure of the range of the surface from which they were deflected. It is also possible to use a single pulse type of transmitter/receiver using frequency modulated carrier wave pulse. Such systems can give an indication of the distance of the blade tips from the transmitter/receiver, so that if the transmitter/receiver is appropriately positioned, the measured range can be used as a measure of the deflection of the blades from a mean plane. The transmitter/receiver will in general have to be substantially displaced from that plane, typically at a 30° angle. By relating the time of detection of the received radiation to a cyclic reference pulse, any angular displacement of a blade in a horizontal plane about this axis of rotation can also be determined.

In another method the transmitter can be a laser or other source of a collimated beam of radiation, and then the reflected beam can be displaced in dependence upon deflection of the individual rotor blades, so that if for example the reflected beam is directed towards an array of receivers, then the particular receiver in the array receiving the reflected beam will depend upon the amount of deflection and a signal representative of that deflection can be derived. Such a system is of particular value in the case of a tail rotor, where there is usually no scope for relative movement of the blades about the axis of rotation.

Tests have shown that by feeding the received information into a computer which has been suitably programmed, the measured deflections can be available very shortly after the tests have been taken, and indeed it is possible to have a transmitter/receiver mounted on a helicopter for measuring deflections of main rotor blade tips, and a laser beam transmitter and receiver mounted on the tail boom for measuring tail rotor blade deflections, and a computer in the cabin receiving signals from both systems and to have the complete results of tests made at different flight speeds available in flight. When the helicopter lands after the tests, the fitters can immediately make the necessary adjustments to the blade mountings. The invention includes such apparatus as well as the method of using it.

A related invention is the method of displaying the results achieved by one of the above methods, where the method is applied to the deflection of the individual blades of a multi-bladed helicopter rotor, and according to that related invention, for one or each of the blades, the deflections in the cycle of revolution are displayed graphically for one or for each of a number of flight speeds. In particular, the position of mean deflection of all the blades at a particular speed can be determined and the display can be related to that mean deflection graphically.

A further possibility is to show the deflections of all the blades both angularly in relation to each other, and perpendicular to the plane of rotation in relation to the mean deflection for a given flight speed.

A trend chart can be displayed showing a curve for each blade which reveals its deflection at each of a number of speeds in a range, and it is possible for such a display to have curves for all the blades spaced apart along the display, or to display a curve for a single blade.

By detecting time anomilies in the passage of individual rotor blades past a given point—as related to the one per revolution marker—it is possible to detect and identify a defective inter-blade damper and to display the result to the operator. Hitherto, this has not been possible with any degree of certainty.

BRIEF DESCRIPTION OF SEVERAL VIEWS OF DRAWINGS

The invention may be carried into practice in various ways, and one embodiment will now be described by way of example, with reference to the accompanying drawings, in which.

DETAILED DESCRIPTION

The rotor of a helicopter requires balancing both when manufactured and from time to time, so that the rotor blades are equally angularly spaced when seen in plan view, and so that the rotor blade tips all move in the same plane substantially perpendicular to the axis of rotation. The method of adjusting the mounting of the blades to achieve that balance is well understood provided the amount of unbalance of each blade is known, but until now no satisfactory method has been found for accurately detecting the amounts of individual blade unbalance.

Figure 2:
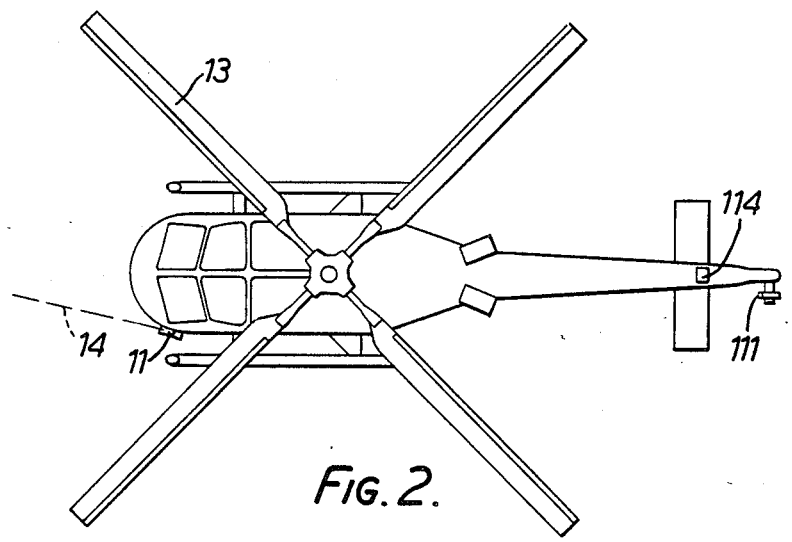
FIG. 2 is a plan view corresponding to FIG. 1.
Figure 4:
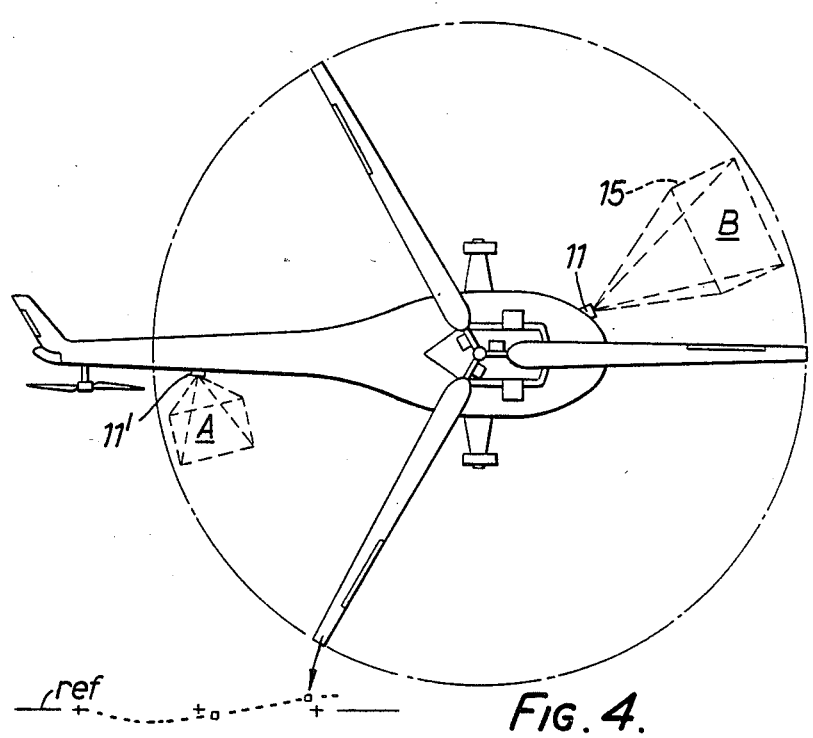

In accordance with the present invention, a double Doppler transmitter/receiver is mounted as indicated at 11 to one side of the cabin just below the door 12, with its central axis of transmission inclined upwardly at an angle of about 35° so as to be intercepted by the tips of the rotor blades 13 as they rotate. FIG. 2 shows that the central axis of transmission 14 is not only inclined upwardly but is inclined inwardly in a preferred arrangement, but FIG. 4, which is a diagrammatic plan view, shows another possible arrangement in which the cone 15 around the central axis of transmission is directed at an angle to the fore-and-aft axis of the helicopter as well as at an angle upwards. The precise position may not matter provided the tips of the rotating blades can give reflected signals to the Doppler receiver. Another possible disposition is shown at 11' in FIG. 4 The tips of the rotor blades have small metal reflecting surfaces fixed to them for giving a good reflected signal.

Figure 1:
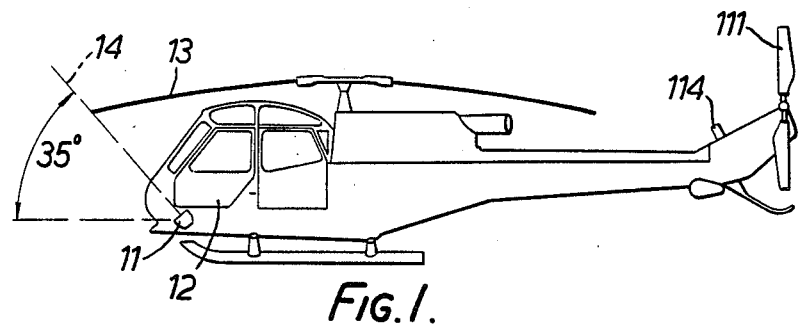
FIG. 1 is a side elevation of a helicopter fitted with track and unbalance detectors in accordance with the invention.
Figure 5:
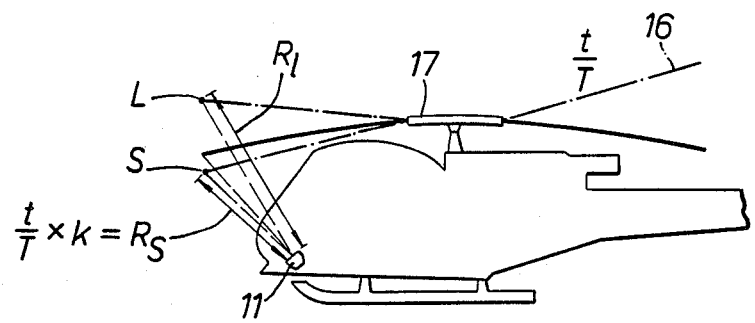

FIG. 1 shows how the rotor blades 13 droop when the rotor is not rotating, and it will be appreciated that as rotation starts, the blades will lift and tend to extend horizontally outwardly, and when they start to lift the helicopter they will start to cone upwards as indicated diagrammatically at 16 in FIG. 5.

FIG. 5 is a diagrammatic view in a vertical plane containing the rotor axis, and containing the transmitter/receiver 11. Extreme positions of a blade in that plane respectively when the rotor is stationary and when it is giving maximum lift, are shown at "S" and "L" and FIG. 5 shows how because of the displacement of the transmitter/receiver 11 below the horizontal plane through the hub 17, movement of a blade tip between "S" and "L" effects a notable difference in the distance $R_s$ or $R_l$ from the transmitter/receiver to the blade tip.

Figure 3:
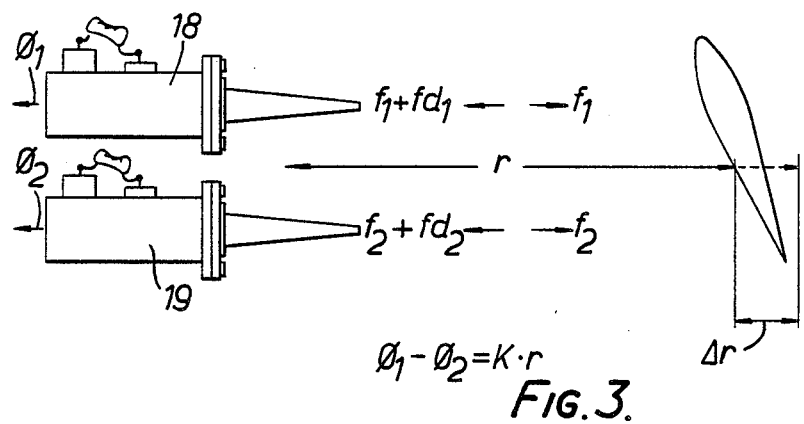
FIGS. 3, 4 and 5 are diagrams useful in explaining the operation of the track and unbalance detector.

The transmitter/receiver uses a multiple frequency carrier wave radar system of the kind described by Skolnik in "Introduction to Radar Systems", page 106, according to which two transmitter receivers as indicated at 18 and 19 in FIG. 3, continuously transmit at frequencies $f_1$ and $f_2$. The reflected signals from a blade tip to the receivers are at $f_1+fd_1$ and $f_2+fd_2$ where $fd_1$ and $fd_2$ are Doppler frequency components derived from the component of velocity of the blade tip towards the transmitter/receiver. The phase difference between the reflected signals is a direct measurement of the range of the blade tip from the transmitter/receiver, and so is approximately a direct measure of the out of track condition. Each blade tip will give a reflected signal to each receiver, so that there will be three pairs of reflected signals in each rotor revolution, as indicated generally at 22 in FIG. 6.

Figure 6:
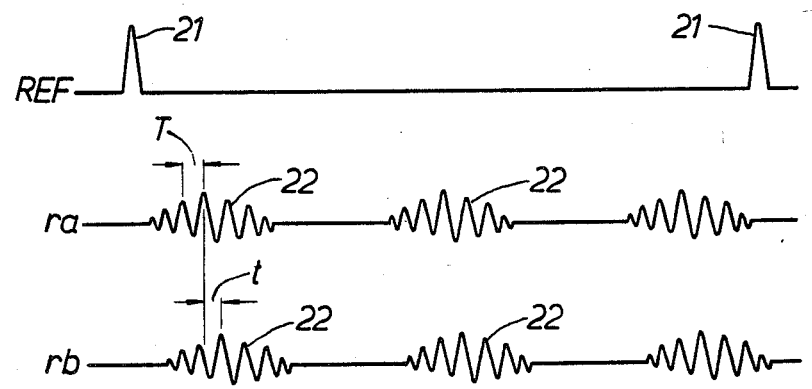
FIG. 6 shows signal characteristics used in the system.

If the difference between the frequencies $f_1$ and $f_2$ is very small compared with $f_1$, then $fd_1$ can be considered to be equal to $fd_2$ and the quotient t/T is directly proportional to the range of the blade tip where t is the phase difference between the reflected signals, as shown in FIG. 6, and T is the frequency difference between the two signals, both differences being expressed in terms of time.

This method of measuring the distance of the rotating blade tips from the transmitter/receiver 11 as they rotate has been found to be surprisingly accurate, and it is possible from an analysis of the received signals to know fairly accurately just how much each blade tip is above or below the average plane of rotation of all the rotor blade tips at the position in a revolution where the cone 15 from the transmitter/receiver is encountered.

Moreover, examination of FIG. 6 shows how the centers of the reflected bursts of radiation can be related to cyclic reference pulses 21 so that analysis will reveal whether the blades are equally angularly spaced horizontally or whether the gap between one blade and its leading neighbor is more or less than the gap between that blade and its trailing neighbor.

Once that information is known, it is well understood how to adjust the mountings of the blades to correct for any out of track condition or lead/lag error.

The invention contemplates having electronic recording and computing equipment onboard the helicopter for recording the results of tests performed when the rotor is rotating on the ground, and when the helicopter is hovering or flying at different speeds because the performance of the blades may well be different at different rotor and flight speeds.

The computer in the recording equipment can be programmed to display the information in a manner which is easily readable.

Figure 7:
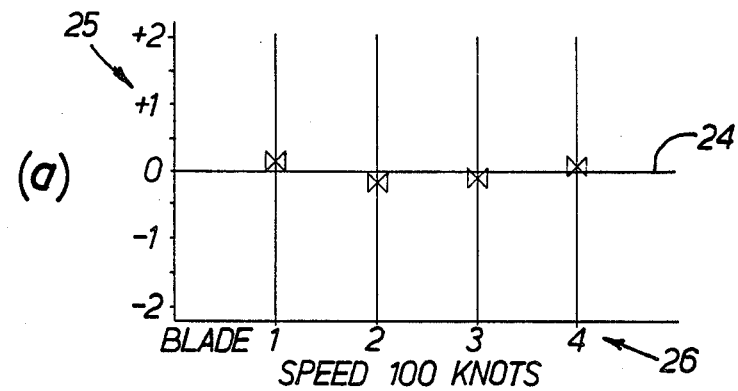
FIGS. 7-12 are various displays of track and unbalance information determined in tests.
Figure 7:
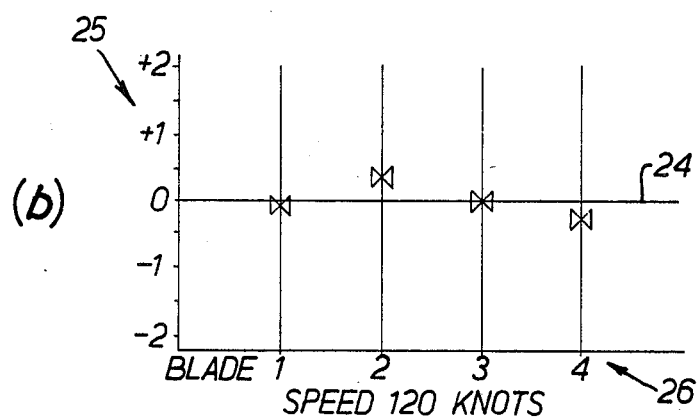
Figure 7:
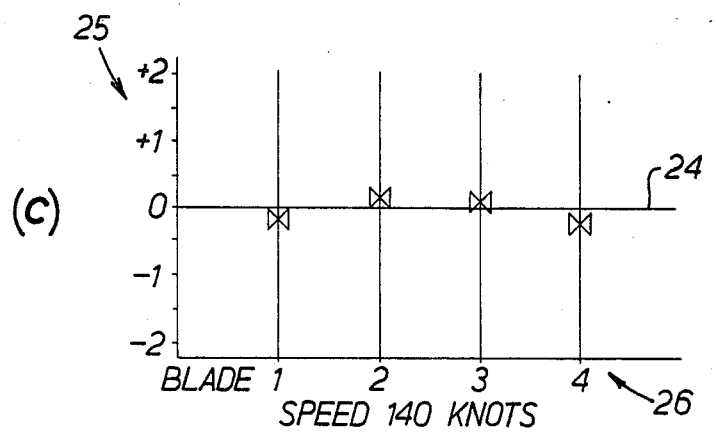
Figure 8:
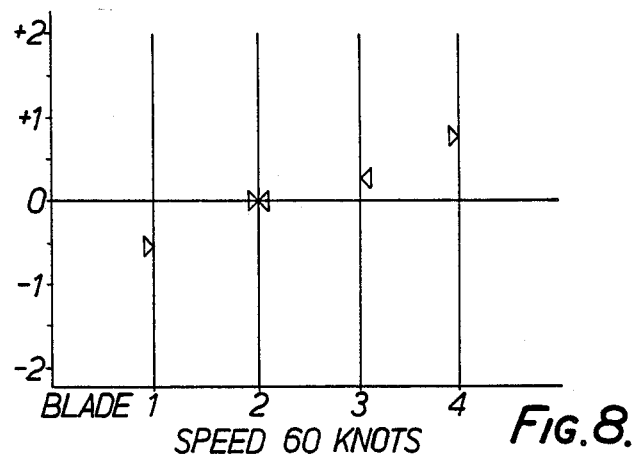

For example, FIG. 7 shows three VDU displays for a particular four bladed helicopter rotor respectively at speeds of 100 knots, 120 knots and 140 knots. The horizontal line at 24 is calculated as the mean height of the rotor blade tips where they intersect the cone of transmission and the height of each blade tip is displayed in relation to that mean. The ordinate is calibrated in inches, as indicated at 25, and the identification of the four blades is indicated at 26. The display for 120 knots shows that the blade number 2 is high at that speed, whereas it is low at 100 knots. In the displays of FIG. 7, all the blades are correctly angularly spaced, but in an alternative display at 60 knots, shown in FIG. 8, although the second blade is correctly positioned angularly, it can be seen that blades 1 and 4 are leading from their correct angular position, whereas blade 3 is lagging. The fitter studying that display can easily make an appropriate adjustment to the blade mountings.

Figure 9:
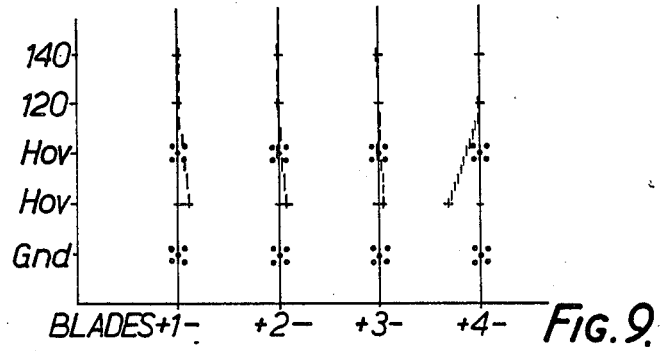

The computer is also programmed to collect the results for all four blades at various flight speeds, and display them in a summary display indicated in FIG. 9. For each of the four blades, readings at each of the test speeds are displayed along a different vertical line being on the line, or to one or other side of the line, according as the blade tip is at the mean level or is above or below that level during the corresponding test. For example, FIG. 9 shows how blade number 1 is low during hovering, but gradually comes up towards the mean level as the flight speed increases until it is consistently just below the mean level in the range 120 to 140 knots.

Figure 10:
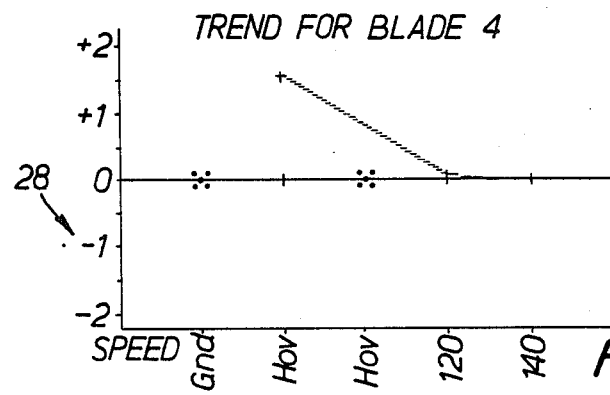

FIG. 10 is a display corresponding to FIG. 9 of a selected blade—in that case blade number 4—and since a "trend" curve for only one blade is shown, it is possible to calibrate the ordinate in terms of inches of deflection, as indicated at 28.

During a test, there will be many revolutions of the rotor and the readings during each revolution are recorded and stored and mean readings are accumulated.

Figure 11:
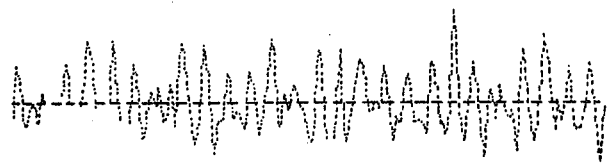
Figure 12:
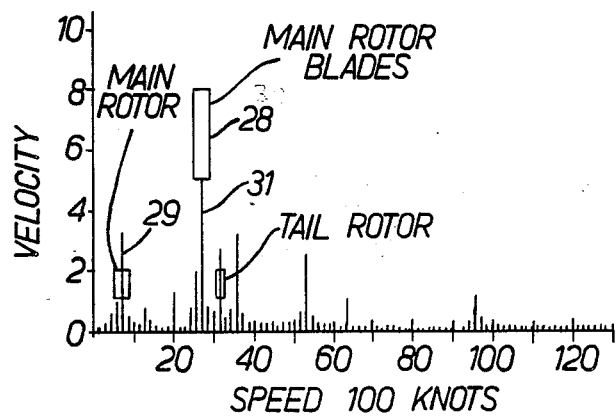

It is possible, for each of a number of different helicopter designs, to perform tests to achieve a characteristic of that helicopter design revealing a compound signature of the rotating masses. Thus, a typical characteristic vibration display at a certain air speed for a certain helicopter design may be as shown in FIG. 11. That characteristic may be recorded and fed into the computer prior to a display of measurements made on a particular helicopter, and then the vibrations actually measured on that particular helicopter may be displayed as shown in FIG. 12. It would be possible by programming-in flashes, as for example at 30, showing the calculated maximum permissible amplitude of vibration of each component, to enable the user seeing the measured characteristic to decide straight away that the rotor or any other component so labeled was, or was not, satisfactory. For example, the vibration peak at 29 extends beyond the flash 30 and that would not be acceptable, whereas the peak 31 does not extend beyond its flash 30 indicating an acceptable level of vibration amplitude for the main rotor blades.

Figure 13:
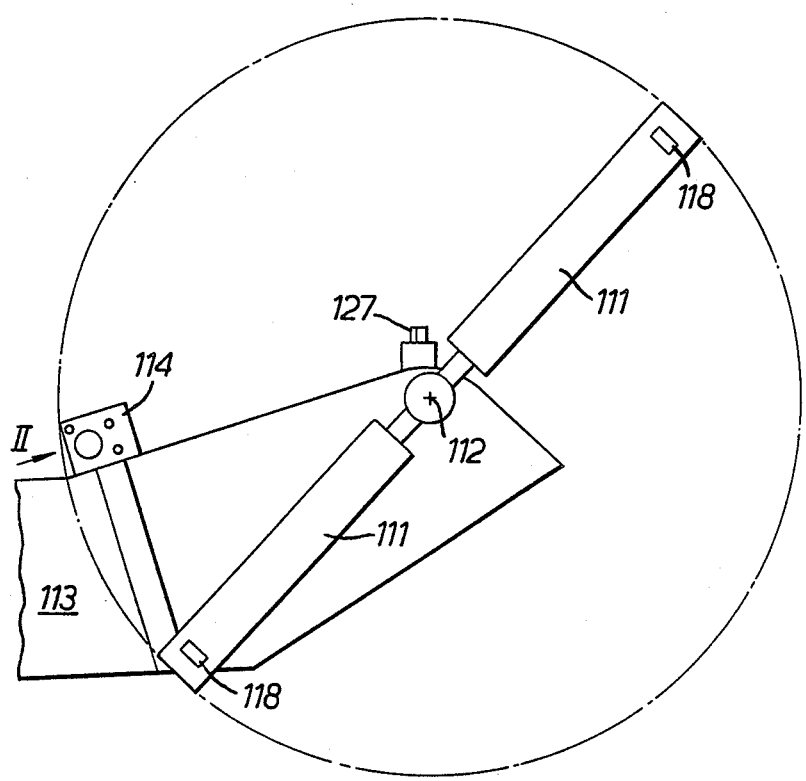
FIG. 13 is an elevation of the tail of a helicopter showing the tail rotor; and, FIG. 14 is a view seen in the direction of the arrow II in FIG. 13.

In order to be able to balance the tail rotor of a helicopter, it is necessary to perform a test at one or more flight speeds to measure the deflection of each blade in relation to the mean plane of rotation of the blade tips. In FIG. 13, the rotor is shown as having two blades 111 and in common with most helicopter tail rotors, the blades have no freedom of movement about the axis of rotation 112 so that any out of track in the rotor will be represented merely as a deflection of the tip of a blade towards or away from the tail boom 113.

In accordance with this invention, the blade tip deflection is measured as the rotor rotates, by means of a laser beam and a photo diode array. These are contained in a light box 114 which is mounted above the boom, so that a laser beam 115 from a laser diode 116 is interrupted by the blades as they rotate as shown diagrammatically at 117 in FIG. 14. Each blade 111 has a reflective strip 118 near its tip which might be an applied strip of aluminum, or an area of reflective glass beads for example. Light reflected from the area 118 is received by one of an array 119 of photo-diodes mounted in the light box, the array extending within the range defined by the two arrows 121.

Figure 14:
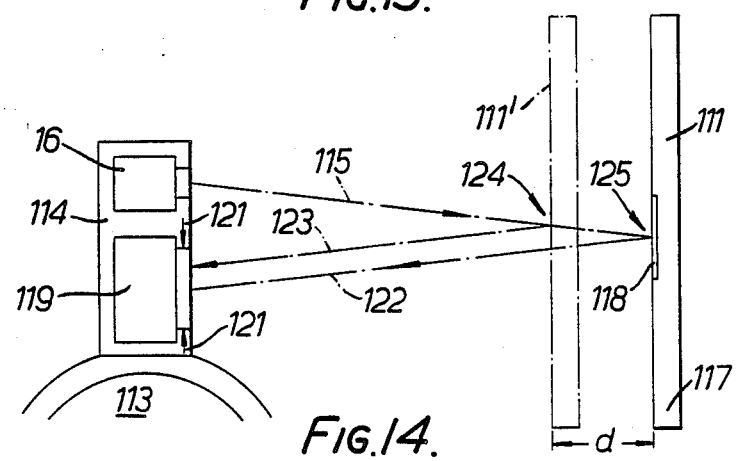

An undeflected rotor blade 111, that is to say one rotating in the correct theoretical plane, is shown in solid lines in FIG. 14, and it can be seen that the reflected laser beam 122 is received by a photo-diode at the center of the array.

If, on the other hand, the blade is deflected towards the boom 113, by a distance 'd', as shown in chain lines at 111', the reflect laser beam 123 will be received by a photo-diode nearer one edge of the array 119. That may be merely because the point of reflection 124 is nearer to the light box 114 than the point of reflection 125 for the undeflected blade 111, or it may also be because the deflection 'd' is due to angular deflection of the blade about the hub axis 112, so that the plane of the reflecting surface 118 is at an angle to the plane of the undeflected blade.

In the example shown in FIG. 14, some specimen dimensions are given. The rotor blade tips are at a radius of 185 cms from the hub axis 112, and the undeflected blade plane is at a distance of 300 cms from the face of the light box 114 and perhaps 10 cms from the side of the boom 113. The sort of deflection that may be experienced is unlikely to be more than 3 or 4 cms, but the optical arrangement can be such that the particular photo-diode in the array 119 that receives the reflected beam 122 or 123 can give an accurate indication of the amount of deflection of the blade.

A signal can be obtained by reflection from a black patch or other reflecting surface on the rotor to act as a reference signal defining each rotor rotation, so that the output from the photo-diode array can be related to those reference signals and identification of the blades giving the signals can be made.

An accelerometer 127 is mounted on the hub bearing, and the output from that, after filtering to exclude components above and below the fundamental frequency of rotation, can be used to provide a reference sine wave which can be related to the cyclic pulse signals from the black patch or other reference surface, and then examination of the phase angle between the sine wave peaks and the black patch signals can given an indication of the degree of dynamic out-of-balance of the tail rotor by well understood methods.

This apparatus for measuring the degree of out-of-balance of a tail rotor can be used in combination with the apparatus, the subject of FIGS. 1-6, for measuring the out-of-balance of a main helicopter rotor and for displaying the results visually. The computer described can thus receive inputs from the light box 114 and the acceleromter 127.

Although the invention has been described as applied to measurement of deflection of blade tips on a rotor, it will be appreciated that it is applicable to measuring deflections at different points in any rotating mass. For example, the signals can be received from the blades of a propeller, fan or a rotating turbine rotor, or could be obtained from positions along a rotating shaft subject to whirling and critical speed deflections.

Again, the invention has been described in FIGS. 3-6 as using a double Doppler method of obtaining a phase difference signal representing the range of the component giving the reflections, but it would also be possible to use a pulsed frequency modulated carrier wave signal in which in each pulse the frequency was modulated from the beginning to the end of the pulse, and the amplitude was also modulated. By using signals selected from reflected pulses at the beginning and the end of the pulses, range can also be determined.

While this invention is susceptible of embodiment in many different forms, there is shown in the drawings and herein described in detail a preferred embodiment of the invention with the understanding that the present disclosure is to be considered as an exemplification of the principles of the invention and is not intended to limit the broad aspect of the invention to the embodiments illustrated.

I claim:

1. A method of testing a helicopter rotor having blades, comprising the steps of receiving a signal from each of the rotating blades during each rotation of the rotor indicative of the angular position and height of the blade tip during that revolution while the helicopter is in flight, converting the indicative signals into electronic data, and storing the electronic data in a memory of a computer on board the helicopter and displaying pictorially the blade positions both in the helicopter and subsequently.

2. A method as claimed in claim 1, in which the displayed positions are mean positions of individual blades over a number of body revolutions.

3. A method as claimed in claim 1, in which information relating to the helicopter is stored in the memory before the beginning of the test.

4. A method as claimed in claim 1, in which the test is performed at different flight speeds of the helicopter.

5. A method as claimed in any of claims 1, 2 and 4, in which the computed positions of all the blades at a particular flight speed are displayed simultaneously.

6. A method as claimed in any of claims 1, 2 and 4, in which the deflection of one or all blades at a plurality of different flight speeds are displayed graphically simultaneously.

7. Apparatus for testing a helicopter rotor having blades, including a receiver of signals characterized by the movement of the individual blades as the rotor rotates, a memory for storing information derived from the received signals, a computer arranged to compute from the received signals and from the stored information, the positions with respect to a selected plane perpendicular to the axis of rotation of the individual blades during rotation, and means for displaying during the test, and recording, the computed blade positions, the receiver, computer, and memory being adapted to be mounted in the helicopter for use during flight.

* * * * *

US004887087B1

REEXAMINATION CERTIFICATE (1666th)

United States Patent [19]

Clearwater

[11] B1 4,887,087

[45] Certificate Issued  Mar. 24, 1992

[54] METHOD OF DISPLAYING DETECTED INFORMATION ABOUT A ROTATING MASS

[75] Inventor: Walter A. Clearwater, Droitwich, England

[73] Assignee: Micro Control Technology Limited, Fleet, United Kingdom

Reexamination Reqs:st:
No. 90/002,218, Dec. 5, 1990
No. 90/002,256, Jan. 22, 1991

Reexamination Certificate for:
Patent No.: 4,887,087
Issued: Dec. 12, 1989
Appl. No.: 475,252
Filed: Mar. 14, 1983

[30] Foreign Application Priority Data

Mar. 16, 1982 [GB] United Kingdom ............... 8207575
Apr. 22, 1982 [GB] United Kingdom ............... 8211646

[51] Int. Cl.$^5$ .............................................. G01S 13/00
[52] U.S. Cl. ........................................ 342/61; 342/127
[58] Field of Search .................. 342/61, 127; 73/455, 73/462, 178 H

*Primary Examiner*—Mark Hellner

[57] ABSTRACT

In a method of detecting the deflection of the blades 13 of a helicopter rotor as it rotates, a beam 14 of radiation from a transmitter/receiver 11 encounters the tips of the rotating blades which send reflected signals to the receiver. The phase difference due to deflection of the blade tip can be used to give a measure of the deflection of each blade, and that can be displayed graphically as shown in FIGS. 7-10 for the various blades at various speeds. In a related method of measuring deflections of the blades 111 for a tail rotor, a laser beam transmitter 16 in FIG. 14 has its reflected beam 122, 123 from an undeflected blade 111 or a deflected blade 111' received by a particular receiver in a linear array 119 of receivers so that the particular receiver gives an indication of the amount of deflection.

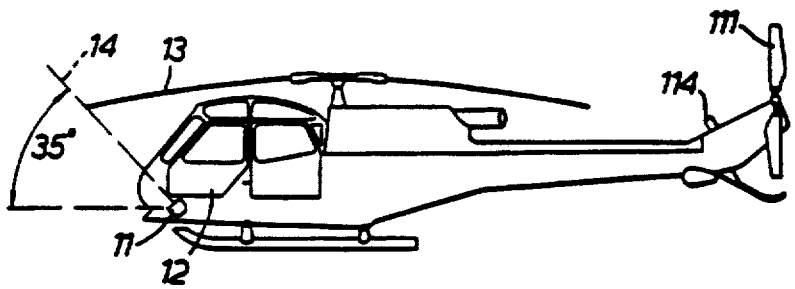

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–7 is confirmed.

* * * * *